May 30, 1933.  J. B. DOW  1,912,265
CONTROL MECHANISM FOR CONSTANT FREQUENCY OSCILLATOR APPARATUS
Filed July 25, 1931
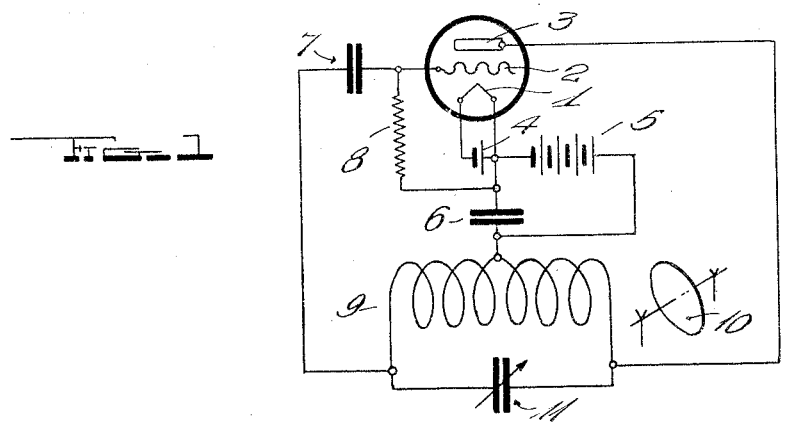
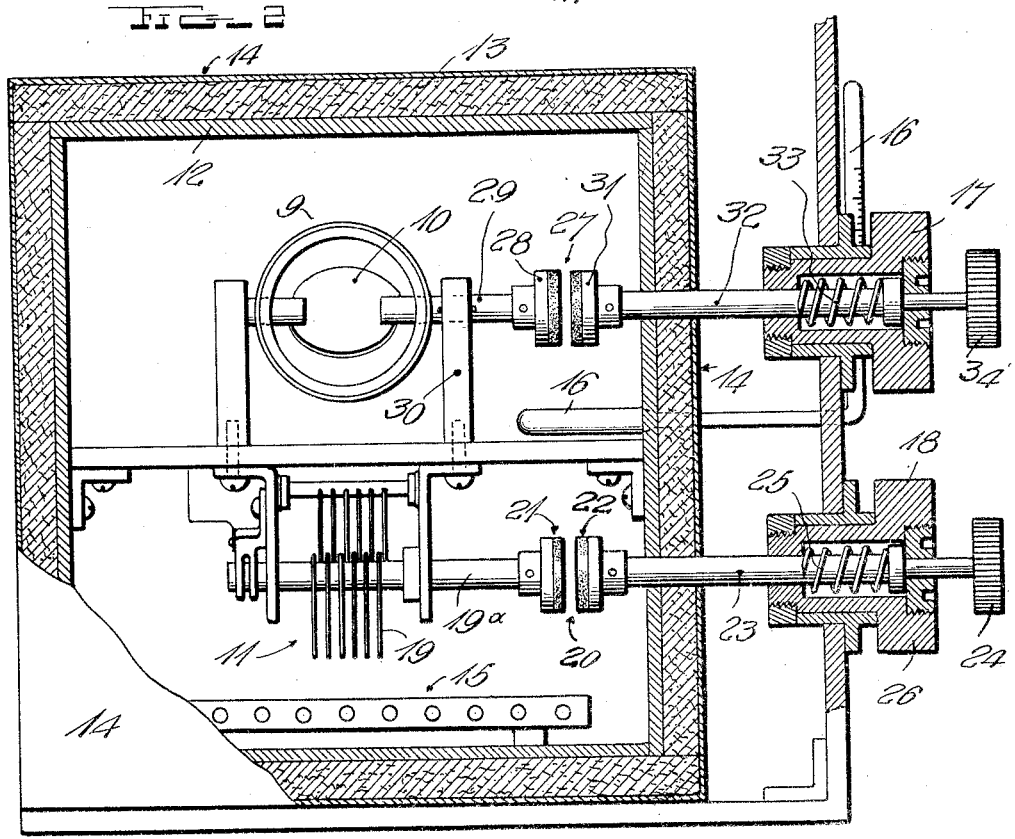
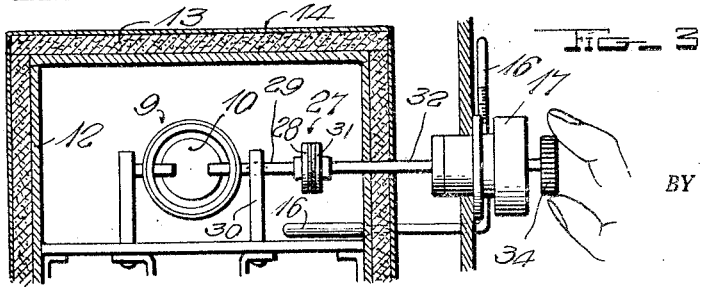
INVENTOR.
Jennings B. Dow,
BY Robert A. Lavender
ATTORNEY Patented May 30, 1933

1,912,265

UNITED STATES PATENT OFFICE

JENNINGS B. DOW, OF ALEXANDRIA, VIRGINIA

CONTROL MECHANISM FOR CONSTANT FREQUENCY OSCILLATOR APPARATUS

Application filed July 25, 1931. Serial No. 553,220.

My invention relates broadly to frequency control apparatus, and more particularly to a constant temperature cabinet structure for frequency control apparatus having mechanical adjusting means operative from the exterior of the cabinet for the apparatus installed within the cabinet.

One of the objects of my invention is to provide means for adjusting electrical inductances and capacitances installed within a constant temperature cabinet from the exterior thereof, and at the same time, prevent minute but objectionable mechanical strains from disturbing the precision adjustment of the apparatus after such adjustment has been completed.

Another object of my invention is to provide means for adjusting frequency control apparatus within a constant temperature controlled compartment and at the same time, prevent strains resulting from expansion and contraction of external portions of the adjusting mechanism from altering the precision adjustment of the frequency control apparatus.

A further object of my invention is to provide means for adjusting frequency control apparatus within a constant temperature controlled compartment which will minimize the transfer of heat from the compartment through that portion of the adjusting mechanism which extends into the constant temperature controlled compartment from the exterior operating position.

Still another object of my invention is to provide a construction of precision adjusting mechanism for frequency control apparatus within a constant temperature controlled cabinet comprising disengageable rotatable clutch members operative from the exterior of the cabinet for effecting precision adjustment of frequency control apparatus within the cabinet without effecting a heat transfer, and thus impairing the accuracy of the temperature control of the apparatus within the cabinet.

Other and further objects of my invention will be understood from the specification hereinafter following by reference to the accompanying drawing, in which:

Figure 1 diagrammatically illustrates an electron tube oscillator circuit, portions of which are installed within a constant temperature controlled cabinet; Fig. 2 is a cross-sectional view taken through a constant temperature controlled cabinet, showing the arrangement of the adjusting mechanism incorporating the features of my invention; and Fig. 3 shows particularly the method of engaging the adjusting mechanism with the frequency control apparatus for selectively controlling the operation of the frequency control apparatus.

Whenever it is desired to maintain the frequency of oscillation of electron tube oscillators at a nearly constant value for long periods of time and independent of changes in ambient temperature, it is customary to place such oscillators or essential portions of the circuits of such oscillators within a cabinet or compartment maintained at a constant temperature.

In Fig. 1, I have shown a circuit diagram of an electron tube oscillator which is one example of a number of different types of circuits often found desirable to be placed in a constant temperature controlled cabinet. This circuit includes an electron tube containing a cathode element 1, a control grid element 2, and an anode element 3. Battery 4 supplies the necessary cathode heating energy, while battery 5 supplies the required anode potential. Reference character 6 indicates a blocking condenser, 7 indicates a grid condenser, and 8 shows a grid leak resistance connected between the cathode and grid. An inductance 9 shunted by the variable capacity 11 substantially fixes the frequency of oscillation of the electron tube circuit. Coarse changes in frequency may be made by varying the value of capacity 11 and precise changes in frequency may be made by adjusting the angular position of eddy current disc 10 which is pivotally mounted within the inductance 9. Disc 10 is of conducting material such as copper, and when the plane of this disc is normal to the axis of inductance 9, the induced eddy currents in disc 10 act to reduce the inductance of coil 9. When the plane of disc 10 is parallel to the axis of coil 9, eddy currents in disc 10 are at a minimum, so that in this position the inductance of coil 9 is a maximum. Many other methods of varying the inductance of a coil are, of course, well known, so that the above described method, while convenient, is not essential insofar as the scope of the present invention is concerned; nor is it essential that the particular form of oscillator circuit shown in Fig. 1 be used.

In placing such an oscillator as that shown in Fig. 1 within a constant temperature controlled cabinet, it is customary to extend the adjusting means for capacity 11 and for disc 10 through the sides of the cabinet, in order to permit of adjustments of the frequency of oscillation to be made without opening the cabinet structure.

I have made extensive investigations of high precision oscillators and have found it essential to eliminate all mechanical connections between frequency determining portions of the apparatus within constant temperature controlled cabinets and external adjusting devices, if it is desired to maintain the frequency constant to within 0.005 per cent of an adjusted value independent of changes in ambient temperature. I have found that unless such mechanical connections are broken, contraction and expansion due to external temperature effects act to displace the adjustment of apparatus within the cabinet thereby changing the frequency of oscillation and disturbing the precision frequency adjustment of the apparatus. I have also found by breaking such mechanical connections, the heat transfer from within the cabinet to the exterior of the apparatus is reduced considerably and that this reduction in heat transfer assists materially in maintaining a constant temperature within the cabinet.

Fig. 2 illustrates in cross-section a constant temperature controlled cabinet incorporating my invention. The cabinet comprises a heat distributing box 12 surrounded by a heat insulating layer 13 and a metallic container 14. A large portion of the front side of the cabinet is shown cut away to disclose the apparatus within the cabinet. Reference character 15 indicates an electric heater element controlled by thermostat 16 for maintaining the interior of the cabinet at substantially constant temperature. Reference characters 9, 10 and 11, refer to the corresponding parts of the tuning apparatus shown in Fig. 1. Adjusting device 17 arranged exterior to the cabinet 14 serves to adjust the angular position of disc 10 with respect to inductance 9 for varying the effective value of inductance included in circuit. Adjusting device 18 serves to adjust the set of movable plates 19 of variable condenser 11 for varying the effective value of capacity included in the oscillator circuit.

Adjusting device 18 is similar to adjusting device 17 and is shown cut away to disclose its mechanical construction. Reference character 20 shows a friction clutch having one face 21 fixedly connected to the shaft 19a of variable condenser 11, and another face 22 fixedly connected to control device 18 through the intermediary of shaft 23. Clutch 20 is engaged by pressing on knob 24, compressing spring 25, thereby permitting shaft 23 to move longitudinally along its axis. When the two faces of clutch 20 are in contact, control knob 26 may be rotated about the axis of shaft 23 and in this manner the variable plates 19 of condenser 11 may be displaced the desired angular distance. When condenser 11 has been adjusted, knob 24 is released, disengaging clutch 20 after which time any small displacement of shaft 23 due to external temperature effects will not cause the previous adjustment of variable condenser 11 to be changed. Disc 10 is adjustable by means of adjusting device 17 through the intermediary of clutch 27.

The clutch 27 comprises the clutch face 28 which is secured to shaft member 29 journaled in support 30 and connected with the adjustable disc 10. The clutch also includes the longitudinal shiftable clutch face 31 carried by shaft 32 journaled within the adjusting device 17 as heretofore described. The spring member 33 tends to normally shift the clutch face 31 out of engagement with the clutch face 28 but by depressing knob 34 clutch face 31 is engaged with clutch face 28 to permit angular movement to be imparted to shaft 29, for adjusting disc 10. As soon as the hand is released from knob 34, clutch 31 is disengaged from clutch 28 thereby interrupting any thermal transfer path along the shafts and preventing any change in character in shaft 32 and the mounting thereof from interfering with the shaft 29 and disc 10.

Many different forms of construction and arrangement of clutches 20 and 27 and adjusting devices 17 and 18 may be employed and the arrangement shown is to be considered for illustrative purposes only.

Fig. 3 shows the clutch 27 engaged for the transmission of angular movement for adjusting the effective inductance of coil 9 by rotation of disc 10. I have illustrated a condition where the hand of the operator has depressed knob 34 for longitudinally shifting shaft 32 and engaging clutch face 31 with clutch face 28 for imparting the desired selective movement to the disc 10. As soon as the hand of the operator is removed from knob 34 the clutch faces are separated by the longitudinal shaft in position with the clutch face 31 with respect to the clutch face 28.

I have found the combination of apparatus comprising my invention to be of great value in the many fields to which constant frequency oscillators are applicable, and while I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. A frequency control apparatus comprising in combination with a temperature controlled cabinet, a resonant circuit disposed within said cabinet, a rotatable shaft for controlling the adjustment of said circuit, a rotatable actuator extending through said cabinet to a position adjacent said rotatable shaft and means for effecting an engagement between said rotatable actuator and said rotatable shaft for effecting a frequency selection of said circuit and disengaging said rotatable actuator from said rotatable shaft intermediate the frequency selection adjustment.

2. In a frequency control system, a temperature controlled cabinet structure, a high frequency resonant circuit disposed within said cabinet structure, frequency determining elements connected in said circuit, rotatable means controlling each of said frequency determining elements, rotatable actuators projecting through said cabinet structure in a position aligned with each of said rotatable means for adjusting each of said frequency determining elements, said rotatable actuators being longitudinally slidable to engage the rotatable means within said cabinet structure from a position exterior to said cabinet structure for interrupting the thermal path from said rotatable means to said rotary actuators.

3. Frequency control apparatus comprising a temperature controlled cabinet structure, a high frequency resonant circuit arranged within said cabinet structure, rotary tuning means connected in said circuit within said cabinet structure, a rotatable actuator projectible through said cabinet structure and aligned with each of said rotary tuning means, and spring means connected with each of said rotatable actuators for shifting said rotatable actuators longitudinally with respect to said rotary means to a position thermally separated from said rotary means.

4. Frequency control apparatus comprising a temperature controlled cabinet structure, a high frequency resonant circuit disposed within said cabinet structure, frequency determining elements connected in said circuit and mounted within said cabinet structure, rotary means connected with each of said frequency determining elements, a clutch face carried by each of said rotary means, rotatable shaft members aligned with said rotary means and projecting through a wall of said temperature controlled cabinet into the same, a clutch face carried by each of said rotatable shaft members, and means for mounting said rotatable shaft members for effecting an engagement or disengagement between said clutch faces for imparting angular movement to the frequency determining elements when in engaged position and being thermally insulated when in disengaged position.

5. In a frequency control apparatus, a temperature controlled cabinet, an oscillation system in said cabinet, variable tuning elements connected in said oscillating system, a rotary shaft for adjusting the effective value of said variable tuning elements, a clutch on said rotary shaft, a rotatable actuator aligned with said rotary shaft and slidable longitudinally through a wall of said cabinet, a clutch on said rotatable actuator, and spring means for yieldably resisting sliding of said rotatable actuator towards said rotary shaft whereby said clutches may be normally held in spaced relation to each other and at will moved into engagement with each other to permit rotation of the shaft with the rotatable actuator.

6. In an electron tube oscillator system including a temperature controlled compartment and a variable capacity therein, an adjusting device permanently installed for adjusting said variable capacity, the said adjusting device including a shaft extending through a wall of said compartment and means for engaging and disengaging said adjusting device at will with said variable capacity.

7. In an electron tube oscillator system including a temperature controlled compartment and a variable capacity therein having a rotatably mounted shaft, an adjusting device permanently installed for adjusting said variable capacity, the said adjusting device including a shaft extending through a wall of said compartment, and slidably and rotatably mounted, and clutch elements carried by adjacent ends of said shafts for causing the shaft of the variable capacity to turn with the shaft of said adjusting device when the shaft of the adjusting device is thrust inwardly and turned.

8. In an electron tube oscillator system including a temperature controlled compartment and a frequency determining circuit therein one element of which is adjustable, an adjuster assembly extending through a wall of said temperature controlled compartment into the same and movable into and out of operative relation with said adjustable element.

9. In an electron tube oscillator system including a panel, a temperature controlled compartment and a resonant circuit therein having an adjustable element including a rotary shaft, an adjusting device installed externally of said compartment and consisting of a socket engaged through said panel, an actuating shaft slidable through said socket and a wall of said compartment and aligned with the rotary shaft, friction clutch elements carried by adjacent ends of the shafts, and means to yieldably resist inward movement of the actuating shaft and normally retain the clutch elements separated.

10. In an electron tube oscillator system including a temperature controlled compartment and a variable capacity therein having a rotatably mounted shaft, an adjusting device permanently installed for adjusting said variable capacity, the said adjusting device including a socket, an actuating shaft slidable through said socket and into said compartment, clutch elements carried by adjacent ends of said shafts, and a spring in said socket yieldably resisting inward movement of said actuating shaft and normally holding the clutch elements separated.

JENNINGS B. DOW.